US009671622B1

(12) United States Patent
Vetrini et al.

(10) Patent No.: US 9,671,622 B1
(45) Date of Patent: Jun. 6, 2017

(54) COLOR-ENHANCING THIN LENS FOR EYEWEAR

(71) Applicant: Maui Jim, Inc., Peoria, IL (US)

(72) Inventors: Gianni Vetrini, Silvi (IT); Antje Gawronski, Grünenplan (DE); Simon Striepe, Clausthal-Zellerfield (DE); Matthias Döch, Hannover Area (DE)

(73) Assignee: MAUI JIM, INC., Peoria, IL (US)

( * ) Notice: Subject to any disclaimer, the term of this patent is extended or adjusted under 35 U.S.C. 154(b) by 0 days.

(21) Appl. No.: 15/139,062

(22) Filed: Apr. 26, 2016

(51) Int. Cl.
*G02C 7/10* (2006.01)
*G02C 7/12* (2006.01)
*G02B 1/11* (2015.01)

(52) U.S. Cl.
CPC ............ *G02C 7/104* (2013.01); *G02C 7/102* (2013.01); *G02C 7/12* (2013.01); *G02B 1/11* (2013.01); *G02C 2202/16* (2013.01)

(58) Field of Classification Search
CPC .......... G02C 7/10; G02C 7/102; G02C 7/104; G02C 7/107; G02C 7/112
USPC ............ 351/159.49, 159.6–159.65; 359/722
See application file for complete search history.

(56) References Cited

U.S. PATENT DOCUMENTS

| 5,054,902 | A | 10/1991 | King |
| 6,145,984 | A | 11/2000 | Farwig |
| 6,334,680 | B1 | 1/2002 | Larson |
| 7,597,441 | B1 | 10/2009 | Farwig |
| 7,717,557 | B2 | 5/2010 | Kobayashi et al. |
| 8,210,678 | B1 | 7/2012 | Farwig |
| 8,733,929 | B2 | 5/2014 | Chiou et al. |
| 8,770,749 | B2 | 7/2014 | McCabe et al. |
| 9,134,547 | B2 | 9/2015 | McCabe et al. |

*Primary Examiner* — Darryl J Collins
(74) *Attorney, Agent, or Firm* — Brinks Gilson & Lione

(57) ABSTRACT

The presently presented inventive lens will provide an eyeglasses/sunglasses wearer with improved perceptions of color saturation and optical contrast without requiring any apparent coloration (except gray) in the transmitted tint (although other colors may be used), promoting a sense of heightened accuracy and differentiation in viewed colors while providing full protection from UV. Further, the lenses of the invention provide increased visual acuity, and maximize the visibility of objects partially obscured by fog or atmospheric haze. Lens embodiments having certain spectral-transmission properties as defined herein achieve one or more of these objects, while filtering out (i.e., providing local/relative minima) of certain human-visible light wavelengths in a manner enhancing crisp color perception. In particular, the present disclosure provides a very thin lens with a tetrachromatic transmittance profile that offers wearers crisp, clear, and vibrant color perception, while reducing overall light transmission in a manner that enhances wearer comfort.

20 Claims, 2 Drawing Sheets

COLOR-ENHANCING THIN LENS FOR EYEWEAR

TECHNICAL FIELD

Embodiments disclosed herein generally relate to lenses for eyewear with light transmission modified for human color vision perception. More particularly, the embodiments relate to thin-profile lenses that use color-filter technology, optical polarization, and the principles of human color perception, to produce eyewear lenses that balance saturation of colors enhancing visual crispness and filter out colors that cause interference.

BACKGROUND

Sunglasses provide comfort for human wearers by attenuating bright light. Most modern sunglasses also filter out ultraviolet (UV) light (which can harm the eye with long-term exposure) and many also filter out infrared light (which can cause ocular discomfort and aggravate certain eye conditions). Some sunglasses operate on the principle of aggressively blocking certain portions of the visible spectrum: an example of these are blue-blocking amber sunglasses. Such sunglasses typically feature high transmission of yellow, orange, and red, diminished transmission of green and blue-green, and virtually no transmission of blue and violet. Color values, as perceived by the typical human eye, are highly distorted by lenses of this type, and—despite acceptance of amber tinting to enhance contrast—loss of chromatic contrast results because their deep yellow-orange tint weakens color differentiation. Certain other color filtering lenses have been made available in the marketplace including those disclosed in U.S. Pat. No. 6,145,984, which is incorporated by reference herein.

A portion of light reflected from many surfaces such as a flat road or water generally is horizontally polarized. This means that, instead of light being scattered in all directions in more usual ways, at least some of the reflected light generally travels in a more horizontally oriented direction relative to the reflecting surface(s). This creates an annoying and sometimes dangerous intensity of light that the human eye experiences as glare. Polarized eyeglasses reduce glare by blocking horizontal light waves which being reflected off various surfaces, as is well known in the optics art. Horizontally-polarized light that is reflected off horizontal surfaces—and to a lesser degree, diagonal surfaces—can be blocked or at least reduced by polarized sunglasses when the polarizing element is oriented in a given way relative to the light and the wearer's eyes. This improves visibility of those surfaces, and—in the case of water and other transparent media—polarized lenses may provide for increased visibility beneath the water or other media surface. By removing or at least reducing blinding reflected glare, and a wearer's need to squint when facing it, polarized lenses also provide increased eye safety and comfort for the wearer. Current lens providing polarization and a desirable color transmission profile typically are at least 3 mm thick.

It may be desirable to make available a thinner and therefore lighter eyewear lens that also provides desirable color transmission characteristics for a human eye, and that may also include an effective polarizing element.

BRIEF SUMMARY

Embodiments of the inventive lens presented here will provide an eyeglasses/sunglasses wearer with improved perceptions of color saturation and optical contrast without requiring any apparent coloration (except gray) in the transmitted tint (although other colors may be used), promoting a sense of heightened accuracy and differentiation in viewed colors while providing full protection from UV. Further, the lenses of the invention provide increased visual acuity, and maximize the visibility of objects partially obscured by fog or atmospheric haze. Lens embodiments having certain spectral-transmission properties as defined herein achieve one or more of these objects, while filtering out (i.e., providing local/relative minima) of certain human-visible light wavelengths in a manner enhancing crisp color perception. In particular, the present disclosure provides a very thin lens with a tetrachromatic transmittance profile that offers wearers crisp, clear, and vibrant color perception.

In one aspect, embodiments disclosed herein may include a lens comprising a front lens element and a rear lens element, each lens element having a convex surface on one side and concave surface on the other side thereof; where at least one of said lens elements comprises a tetrachromatic contrast enhancer; the front and rear lens elements being adhered together with a light-polarizer disposed between the front and rear lens elements, a front exterior surface of the lens being defined by the convex surface of said front lens element, and a rear exterior surface of the lens being defined by the concave surface of rear lens element; and wherein the tetrachromatic contrast enhancer: provides a maximum light transmittance (with respect to CIE illuminant D65) for at least one wavelength within each of four wavelength ranges (local maxima), and a minimum light transmittance within each of three intervening wavelength ranges (local minima) between the local maxima; includes a first local maxima of less than 85% transmittance, a second local maxima of less than 80% transmittance, a third local maxima of less than 83% transmittance, and a fourth local maxima of less than 84% transmittance; and includes a first local minima of less than 50% transmittance, a second local minima of less than 35% transmittance, and a third local minima of less than 20%. In the lens element, the local maxima may include transmittance values in the wavelength ranges of 415 nm to 430 nm, 495 nm to 505 nm, 550 nm to 565 nm, and 615 nm to 645 nm, and the local minima may include transmittance values in the intervening wavelength ranges of 440 nm to 445 nm, 518 nm to 525 nm, and 582 nm to 587 nm.

In certain embodiments, the lens may further include a selected one of a monogradient color treatment, a bigradient color treatment, or nongradient color treatment of at least one of the lens elements, where the selected monogradient color treatment, bigradient color treatment, or nongradient color treatment may reduce transmittance across all wavelengths of human visible spectrum, including reduced local maxima and reduced local minima, relative to a non-color treated lens element (wherein the reduced local maxima may include transmittance values in the wavelength ranges of 415 nm to 430 nm, 495 nm to 505 nm, 550 nm to 565 nm, and 615 nm to 645 nm, and the reduced local minima may include transmittance values in the wavelength ranges of 440 nm to 445 nm, 518 nm to 525 nm and 582 nm to 587 nm). The front lens element, the rear lens element, or both each may be about 0.7 mm thick.

Another embodiment may include a front lens element that is about 0.7 mm thick, and a rear lens element that is about 0.7 mm thick, each lens element having a convex surface on one side and concave surface on the other side thereof; where at least one of said lens elements comprises a tetrachromatic contrast enhancer; the front and rear lens elements being adhered together with a light-polarizer disposed between the front and rear lens elements, a front exterior surface of the lens being defined by the convex surface of said front lens element, and a rear exterior surface of the lens being defined by the concave surface of rear lens element; and wherein the tetrachromatic contrast enhancer: provides a maximum light transmittance (with respect to CIE illuminant D65) for at least one wavelength within each of four wavelength ranges (local maxima), and a minimum light transmittance within each of three intervening wavelength ranges (local minima) between the local maxima; includes a first local maxima of greater than 75% and less than 85% transmittance in the wavelength range of 415 nm to 430 nm, a second local maxima of greater than 70% and less than 80% transmittance in the wavelength range of 495 nm to 505 nm, a third local maxima of greater than 75% and less than 83% transmittance in the wavelength range of 550 nm to 565 nm, and a fourth local maxima of greater than 75% and less than 84% transmittance in the wavelength range of 615 nm to 645 nm; and includes a first local minima of less than 50% transmittance, a second local minima of less than 35% transmittance, and a third local minima of less than 20%. In such an embodiment, the first local minima may be in the wavelength range of 440 nm to 445 nm, the second local minima in the wavelength range of 518 nm to 525 nm, and the third local minima in the wavelength range of 582 nm to 587 nm.

DETAILED DESCRIPTION

Figure 1:
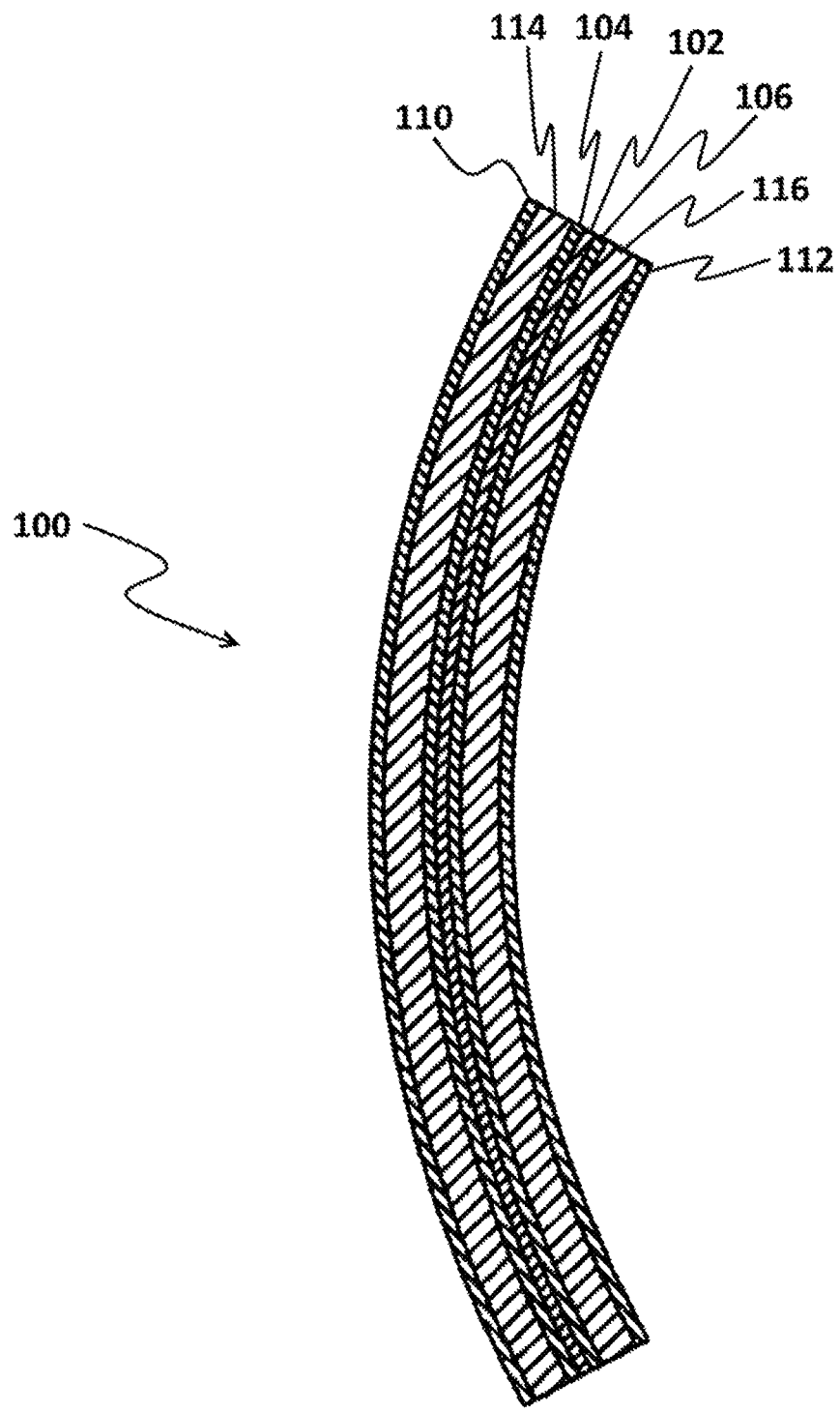
FIG. 1 shows an embodiment of a lens of the present disclosure.

Various embodiments are described below with reference to the drawings in which like elements generally are referred to by like numerals. The relationship and functioning of the various elements of the embodiments may better be understood by reference to the following detailed description. However, embodiments are not limited to those illustrated in the drawings. It should be understood that the drawings are not necessarily to scale, and in certain instances details may have been omitted that are not necessary for an understanding of embodiments disclosed herein, such as—for example—conventional fabrication and assembly.

Embodiments disclosed herein provide a thin profile lens with a color transmission profile that an optimized transmission profile of certain desired colors along selected wavelengths visible to a typical human eye (generally in the range of about 400 nm to about 700 nm), where that optimized transmission profile includes reduced transmission of certain other colors in a manner that enhances a wearer's perception of those desired colors. The thin profile lens most preferably is only about 1.5 mm thick, most preferably within about ±0.05 mm. Stated differently, the presently disclosed lens (including its individual components) provides better transmission and balance of the saturation of colors that are clearly perceived by a typical human eye, while filtering out (that is, transmitting less) of the in-between colors that can be perceived by a human eye as interference. This provides for an improved perception of color intensity and saturation by a wearer, in a profile heretofore not present in eyewear, particularly with the thin lens.

The invention is defined by the claims, may be embodied in many different forms, and should not be construed as limited to the embodiments set forth herein; rather, these embodiments are provided so that this disclosure will be thorough and complete, and will fully convey enabling disclosure to those skilled in the art. As used in this specification and the claims, the singular forms "a," "an," and "the" include plural referents unless the context clearly dictates otherwise.

The term "about" when used with reference to any volume, dimension, proportion, or other quantitative value is intended to communicate a definite and identifiable value within the standard parameters that would be understood by one of skill in the art (equivalent to an optics engineer with experience in the field of eyeglass lenses and/or an optician trained and/or experienced in the structure and function of eyewear lenses), and should be interpreted to include at least any legal equivalents, minor but functionally-insignificant variants, and including at least mathematically significant figures. The terms "sunglasses," "eyeglasses," "eyewear," and other similar terms should be understood interchangeably herein. Reference herein to any industry standards (e.g., ANSI, CIE, etc. standards) is defined as complying with the currently published standards as of the original filing date of this disclosure concerning the units, measurements, and testing criteria communicated by those standards unless expressly otherwise defined herein.

The term "luminous transmittance" as used herein refers to the mean light transmittance of an optical lens or filter over the range of visible wavelengths of light as measured and defined within American National Standards Institute (ANSI) specification Z80.3-2001. The term "light transmittance" as used herein refers to the actual measured value of the passage of light through an optical lens or filter expressed as a percentage of the total amount of light entering the optical lens or filter, and is measured using a specified wavelength of light. A series of individual light-transmittance measurements are made wavelength by wavelength (preferably in 1 nm increments) using an instrument known as a spectrophotometer in order to calculate the luminous transmittance of an optical lens or filter.

The term "CIE illuminant D65" refers to a light source used within the optical industry to simulate the spectral power distribution of midday sun when making spectral transmittance measurements. (CIE is an acronym for "Commission Internationale de l'Eclairage" (i.e., the International Commission on Illumination), and the specific quantification will be understood by those of skill in the art is defined herein by Joint ISO/CIE Standard, ISO 11664-2:2007(E)/CIE S 014-2/E:2006, which is incorporated by reference herein). Specification ANSI Z80.3-2001 is an industry standard that imposes certain restrictions with regard to the light-transmittance properties of sunglass lenses intended for driving and road use. This includes requirements for traffic-signal recognition and uniformity of spectral transmittance, as well as UV limitations (the lens should have a UVB (280 to 315 nm) transmittance of no more than one percent and a UVA (315 to 380 nm) transmittance of no more than 0.3 times the visual light transmittance). Specification ANSI Z87.1-2003 is an industry standard that includes requirements for basic impact and high impact protection. In the basic impact test, a 1 inch (2.54 cm) steel ball is dropped on the lens from a height of 50 in (127 cm). In the high velocity test, a ¼ in (6.35 mm) steel ball is shot at the lens at 150 ft/s (45.72 m/s). For nonprescription sunglass and fashion eyewear requirements, lenses disclosed herein may comply with industry standard, ANSI Z80.3-2010, where in the basic impact test, a ⅝ inch (15.9 mm) (>16 grams) steel ball is dropped on the lens from a height of 50 inches (127 cm). Subject to manufacturing selection of particular glass and coating criteria not claimed as part of the present invention, one or both ANSI standards requirements are met or exceeded by lenses disclosed herein.

As used herein, the phrase "lens element(s)" includes but is not limited to lenses formed of ground and polished mineral glass, crystal, or optical-grade plastic, molded and/or extruded plastic lenses, and flat plastic which is cut and formed into lenses of a desired shape. As used herein, "photochromic" is defined as having the property of darkening (minimizing light transmittance) when exposed to sunlight, and lightening (maximizing light transmittance) when not exposed to sunlight. A photochromic lens element will darken, thus absorbing more light within particular spectra corresponding to a selected color of the photochromic lens element as the intensity of the sunlight (especially within that particular spectra) increases, thereby compensating light level and adjusting related wavelength absorption simultaneously. The darkening range of the photochromic element can be deliberately constrained by controlling its exposure to UV wavelengths in the range of 360 to 400 nm through UV-absorbent coatings applied to its front surface. In one embodiment, a photochromic lens element can be used which has a neutral-gray tint. In such an embodiment, the polarizing film may have a brown tint, while the other lens element may be a tetrachromic contrast enhancer (a/k/a tetrachromatic, i.e., referring to four local maxima within particular color wavelength ranges). The relative contribution of the brown tint to the overall color balance is maintained constant over light level changes, as the neutral-gray photochromic element darkens in bright sunlight to control light intensity without altering the color-filtering properties of the lens. In other embodiments, no photochromic lens elements are used. Either one contrast enhancer lens element (e.g., a tetrachromic contrast enhancer) and one crown-glass (tinted or clear) lens element, or two contrast enhancer lens elements, are laminated together with a polarizing film enclosed within. Such dual-enhancer embodiments produce stronger color and contrast enhancement. The transmitted tint can be neutralized or otherwise adjusted through additional glass or polarizer tints, and/or mirror coatings as is known in the art. In embodiments where no photochromic element is used, the transmission properties do not change when exposed to varying levels of sunlight. Mirror coatings may also be used to adjust appearance and/or light transmission properties of a final finished lens.

The terms "monogradient" and "bigradient" refer to color treatment of lens elements including neutral color tinting, where the intensity of the color/tinting is inversely related to the amount of light transmitted, and where the color treatment is more intense (lower transmittance) along one lens element portion, decreasing along a predetermined gradient to a less intense (higher transmittance) region along another lens element portion. In a typical monogradient lens element, the color treatment is more intense near the top of the lens and less intense along a central—often horizontal—region of the lens element. The same is true in a typical bigradient lens, which further includes a color treatment that is more intense near the bottom of the lens and less intense along the central—often horizontal—region of the lens element. The central—often horizontal—region of the lens element generally corresponds in sunglasses to the default line of vision of a wearer looking straight ahead. A nongradient color treatment provides a generally uniform color for most or all of the lens. There are a variety of processes for creating such gradients, including coating and/or dyeing of lens elements, where glass elements often may be gradient color treated by applying a coating, and polymeric lens elements may be gradient color treated by dyeing. Color treatments may include—for example—gray, rose, bronze, green, or other colors. Examples of these lens element constructions including color treatments, and of photochromic lens element properties (also well known in the art) are set forth, for example, in U.S. Pat. No. 4,838,673 to Richards and Kobayashi, and in U.S. Pat. No. 5,327,180 to Hester and Richards, each of which is incorporated herein by reference in entirety.

In a fully assembled polarized lens of the present disclosure, reference is made to a "front" lens element and a "rear" lens element. As used herein, the "front" lens element is that lens element which has an exposed convex surface, such as the lens element 114 of FIG. 1, and while the "rear" lens element is that lens element which has an exposed concave surface (typically mounted in a frame to be nearer a wearer's eye), such as the lens element 116 of FIG. 1. Methods for making polarized sunglass lenses are well-known within the sunglass industry and art, so that those methods are only summarized herein. In a basic description of assembly, polarized eyeglass lenses are produced by grinding and polishing two round, thin lens elements (typically about 1 mm±0.15 thick) to a precisely-honed curvature configured for nesting the lens elements and forming a polarizer film to a matching curvature so that the lens elements can be fitted tightly together across complementary surfaces. The polarizer film is then laminated between the lens elements (typically with a thin layer of epoxy resin between each lens element and the polarizer film). An appropriate amount of light-curing epoxy resin may be applied between the polarizer film and the lens elements, then the entire lens assembly squeezed together—often with an eccentric orbital scrubbing motion to force out the excess epoxy resin and eliminate trapped air bubbles. The lens assembly may thereafter be subjected to a light source having an output spectrum and intensity suitable to initiate curing of the epoxy resin. After the epoxy has been cured, excess resin and film protruding around the edge of the laminated lens are trimmed away. The lens is then ready to be ground to the required shape and finished around its borders (a process typically referred to as "edging") so that it will fit into an intended eyeglass frame.

One embodiment of a lens is described with reference to FIG. 1, which shows a transverse section view of an assembled lens 100. A polarizing film 102 is secured by front and rear adhesive layers 104, 106 between a front lens element 114 and a rear lens element 116. The assembled lens may include one or more front coating(s) 110 and/or rear coating(s) 112. In one preferred embodiment, the front and rear lens element 114, 116 each is about 0.7 mm thick, and the polarizing film 102 is about 0.1 mm thick, with the adhesive and coatings having negligible thickness so as to provide a lens that is only about 1.5 mm thick (and which may be 1.50 mm thick).

All sunglass lenses of the present invention include a multiband contrast enhancer. A multiband contrast enhancer of the present invention is a light filter in the form of a lens element or layer comprising narrowband and sharp-cut light-filtering means, said light-filtering means preferably being about 0.70 mm thick and providing the following light-transmittance properties within the visible spectrum (about 400 nm to about 700 nm), with respect to CIE illuminant D65: (i) a maximum light transmittance for at least one wavelength within each of four wavelength ranges (local maxima), with minimum light transmittance within each of three intervening wavelength ranges (local minima), the first local maxima wavelength range being from 415 nm to 430 nm, the first local minima wavelength range being from 440 nm to 445 nm, the second local maxima wavelength range being from 495 nm to 505 nm, the second local minima wavelength range being from 518 nm to 525 nm, the third local maxima wavelength range being from 550 nm to 565 nm, the third local minima wavelength range being from 582 nm to 587 nm, and the fourth local maxima wavelength range being from 615 nm to 645 nm; (ii) a minimum light transmittance—in an untinted multiband contrast enhancer—of less than 50% (and preferably less than 45%) for the first local minima, of less than 35% (and preferably less than 25%) for the second local minima, and of less than 20% (and preferably less than 18%) for the third local minima; and (iii) a maximum light transmittance—in an untinted multiband contrast enhancer—of less than 85% (and preferably less than 82%) for the first local maxima, of less than 80% (and preferably less than 77%) for the second local maxima, of less than 83% (and preferably less than 81%) for the third local maxima, and of less than 84% (and preferably less than 82%) for the fourth local maxima. The description "about 0.70 mm" includes at least ±0.05 mm but is not necessarily limited thereby, other than certainly being thinner than presently-existing 0.80-0.85 mm lens elements. As described, the present embodiments relate to a tetrachromic contrast enhancer that provides four local maxima with three intervening local minima, all within the human—visible spectrum.

In certain preferred embodiments, the first local maxima transmittance is at least 1.9× the first local minima, the second local maxima transmittance is at least 3.7× the second local minima, and the third and fourth local maxima transmittance each is at least 6.5× the third local minima.

Figure 2:
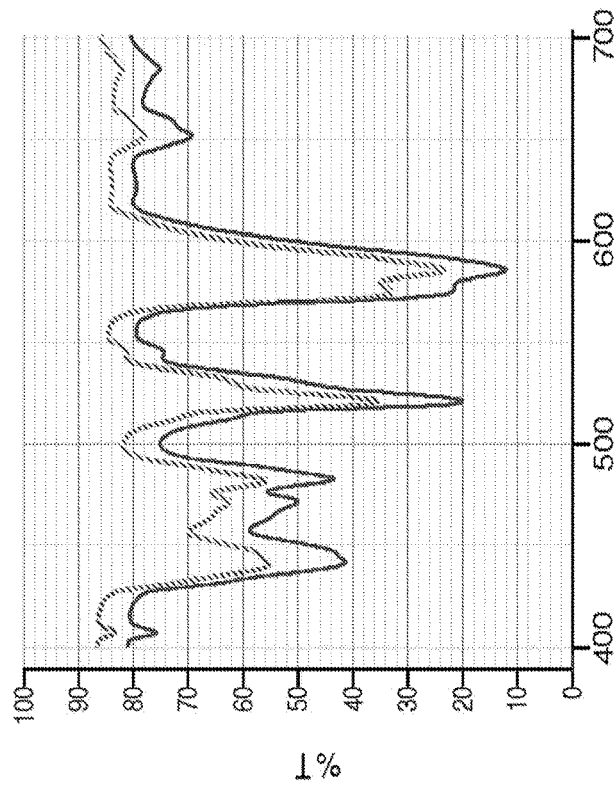
FIG. 2 shows a diagrammatic graph comparing a transmittance versus visible wavelength plot for a prior lens element with a lens element of the present disclosure.

FIG. 2 is a graph that displays the light-transmittance properties (graphed versus wavelengths (nm) of human-visible light spectrum) of a 0.70 mm-thick multiband contrast enhancer (lens element) presently disclosed as compared with the light-transmittance properties of a 0.85 mm thick lens element disclosed in Applicant-owned U.S. Pat. No. 6,145,984, which is incorporated herein by reference in its entirety. Although the general contours with respect to wavelength/transmittance curve are similar between them, the present lens element provides a unique transmittance profile with respect to the differences between the local minima and maxima, as well as with respect to absolute transmittance levels, relative transmittance levels, and the steepness of the curves between the local maxima and local minima. This is even more striking and is outside of what would be expected in the art in view of the fact that the present lens element is only about 0.7 mm thick, which provides notably different optical properties than the prior lenses, in addition to providing a lighter-weight lens that has a different aesthetic appeal as well. However, in view of the present disclosure and the state, those of skill in the art will appreciate the inventive embodiments including that they will be able to make and use lens elements with the properties described and claimed herein.

Certain types of base glass, such as borosilicate type composition may be preferred for glass lenses of the present invention. A base glass composition is a glass formulation to which various colorants or other dopants can be added in order to produce the desired light transmittance and other properties in a finished glass lens element. For multiband contrast enhancers described herein, a preferred base glass composition will provide sharp-cut filtering of the wavelengths identified (by which it is meant that the transmission differences between the maxima and minima are steep).

One advantage of particular types of sharp-cut UV-blocking glass is a very mild coloration that is virtually unnoticeable in some formulations to human eyes. This mild coloration provides a desirable base from which to treat the glass for reaching desired tint and light transmittance (e.g., by adding selected colorants to the glass during the manufacturing process). Examples of nearly-colorless ophthalmic glass for blocking UV and violet wavelengths have been patented or are otherwise publicly disclosed and include certain products that are available from Schott and Corning. Processes for manufacturing sharp-cut filter glass are the subject of various patents including U.S. Pat. No. 5,925,468 issued to Stewart; U.S. Pat. No. 6,420,290 B1 issued to Brocheton, et al; U.S. Pat. No. 6,667,259 issued to Clasen, et al; and U.S. Pat. No. 6,852,657 issued to Kolberg, et al.

One example of sharp-cut UV filter glass in a nearly-colorless formulation known as "UV420" is available from Schott AG of Mainz, Germany. This glass composition utilizes copper halide, is compatible with rare-earth oxides such as used in the present invention, and thus can be used as the base composition into which the selected rare-earth oxides are added to produce the multiband contrast enhancer of the present invention. Schott UV420 is useful for sharp-cut filtering up to about 420 nm in lens elements of 1 mm thickness. A similar glass composition is available from Corning SA of Avon Cedex, France.

For embodiments disclosed here that utilize glass lens elements, the multiband contrast enhancer preferably is an ophthalmic glass lens element within a typical thickness range of approximately 0.65 to 0.75 mm (most preferably 0.70 mm). The color transmission profile may be obtained by doping or otherwise treating the base glass rare earth metal oxides that may include one or more of cerium, lanthanum, neodymium erbium, yttrium, ytterbium, dysprosium, and praseodymium. Those of skill in the art will appreciate that the amounts and ratios of these oxides are selected to produce a multiband contrast enhancer with the exact light transmittance properties desired and described within the scope of the present disclosure and claims, and—in view of the present disclosure—those of skill in the art can provide such without undue experimentation. For example, it is known in the optics field that neodymium oxide may be used to attenuate wavelengths around 585 nm, erbium oxide may be used to attenuate wavelengths around 520 nm, and praseodymium oxide may be used to attenuate wavelengths around 420 nm to 460 nm, while other rare earths can be used to impart color and/or to attenuate particular wavelengths (both of visible light and of near-visible spectra). Visible-light absorbing/attenuating dyes can be used in polymeric lens elements, as generally known in the art (see, e.g., U.S. Pat. No. 8,210,678).

In order to reduce unwanted reflections from the surfaces of finished lenses, anti-reflective ("AR") coatings can be applied to lenses disclosed herein. Typically, AR coatings on sunglass lenses are applied the rear (concave) surface, which prevents or at least minimizes light striking the rear surface of the lenses from reflecting back into the wearer's eyes. It also prevents a wearer from seeing a reflection of his/her eyes from the rear face of the lenses. A high-quality AR coating comprises several stacked layers of transparent material, often a metallic fluoride (e.g. magnesium fluoride), deposited on the surface of a lens in a vacuum chamber. A hydrophobic coating that may include silicon can be applied on top of the AR coating to facilitate cleaning and to prevent or at least minimize water spots and other forms of staining.

One example of a useful AR coating is disclosed in U.S. Pat. No. 7,717,557, which is incorporated herein by reference.

Each of the lens element embodiments described herein may be assembled into a completed lens with polarizing element and coatings, then mounted onto eyewear frames. The frames may be metal, polymer, or other materials, or any combination thereof. In preferred embodiments the optical properties of the lenses are not significantly affected by the outer contour and shape of the edges of the finalized lens, which typically is varied to complement a certain frame and to provide a particular appearance and/or function of final eyeglasses/sunglasses. Lenses that further include frames provide functional and aesthetic benefits to a wearer.

Those of skill in the art will appreciate that embodiments not expressly illustrated herein may be practiced within the scope of the claims, including that features described herein for different embodiments may be combined with each other and/or with currently-known or future-developed technologies while remaining within the scope of the claims. This specifically includes that lenses finished with particular colors, color gradient treatment (e.g., coatings of glass lens elements, dyes of polymeric lens elements, where the gradient treatment may be monogradient or bigradient), and/or other treatments may have a final transmission profile (i.e., in a commercial pair of sunglasses) that varies from the transmission profiles described and claimed here, but it is to be understood that the present description and claims may be applied to "lens blanks" during manufacture, as well as to finalized lenses. Although specific terms are employed herein, they are used in a generic and descriptive sense only and not for purposes of limitation unless specifically defined by context, usage, or other explicit designation. It is therefore intended that the foregoing detailed description be regarded as illustrative rather than limiting. And, it should be understood that the following claims, including all equivalents, are intended to define the spirit and scope of this invention. Furthermore, the advantages described above are not necessarily the only advantages of the invention, and it is not necessarily expected that all of the described advantages will be achieved with every embodiment. In the event of any inconsistent disclosure or definition from the present application conflicting with any document incorporated by reference, the disclosure or definition herein shall be deemed to prevail.

We claim:

1. A lens comprising a front lens element and a rear lens element,
   each lens element having a convex surface on one side and concave surface on the other side thereof;
   where at least one of said lens elements comprises a tetrachromic contrast enhancer;
   the front and rear lens elements being adhered together with a light-polarizer disposed between the front and rear lens elements,
   a front exterior surface of the lens being defined by the convex surface of said front lens element, and a rear exterior surface of the lens being defined by the concave surface of rear lens element; and
   wherein the tetrachromic contrast enhancer:
      provides a maximum light transmittance with respect to CIE illuminant D65 for at least one wavelength within each of four wavelength ranges (local maxima), and a minimum light transmittance within each of three intervening wavelength ranges (local minima) between the local maxima;
      includes a first local maxima of less than 85% transmittance, a second local maxima of less than 80% transmittance, a third local maxima of less than 83% transmittance, and a fourth local maxima of less than 84% transmittance; and
      includes a first local minima of less than 50% transmittance, a second local minima of less than 35% transmittance, and a third local minima of less than 20%.

2. The lens of claim 1, where the local maxima include transmittance values in the wavelength ranges of 415 nm to 430 nm, 495 nm to 505 nm, 550 nm to 565 nm, and 615 nm to 645 nm.

3. The lens of claim 1, where the local minima include transmittance values in the intervening wavelength ranges of 440 nm to 445 nm, 518 nm to 525 nm, and 582 nm to 587 nm.

4. The lens of claim 1, further comprising a selected one of a monogradient color treatment, a bigradient color treatment, or nongradient color treatment of at least one of the lens elements.

5. The lens of claim 4, where the selected monogradient color treatment, bigradient color treatment, or nongradient color treatment reduces the transmittance across all wavelengths of human visible spectrum, including reduced local maxima and reduced local minima, relative to a non-color treated lens element.

6. The lens of claim 5, where the reduced local maxima include transmittance values in the wavelength ranges of 415 nm to 430 nm, 495 nm to 505 nm, 550 nm to 565 nm, and 615 nm to 645 nm.

7. The lens of claim 5, where the reduced local minima include transmittance values in the wavelength ranges of 440 nm to 445 nm, 518 nm to 525 nm and 582 nm to 587 nm.

8. The lens of claim 1, further comprising an anti-reflective coating.

9. The lens of claim 1, where the front lens element, the rear lens element, or both each is about 0.7 mm thick.

10. The lens of claim 1, where a combined thickness of the front lens element, rear lens element, and light-polarizer is about 1.5 mm.

11. The lens of claim 1, where a thickness of the front lens element is 0.70 mm, a thickness of the rear lens element is 0.70 mm, and a thickness of the light-polarizer is 0.10 mm, providing combined lens thickness of 1.50 mm.

12. The lens of claim 1, where one of the lens elements is photochromic.

13. The lens of claim 1, further comprising a mirror coating.

14. The lens of claim 1, where the first local maxima is greater than 75% transmittance, the second local maxima is greater than 70% transmittance, the third local maxima is greater than 75% transmittance, and the fourth local maxima is greater than 75%.

15. The lens of claim 1, where the lens comprises a borosilicate glass and further comprising frames with the lens being mounted into the frames.

16. A lens comprising:
   a front lens element that is about 0.7 mm thick, and a rear lens element that is about 0.7 mm thick,
   each lens element having a convex surface on one side and concave surface on the other side thereof;
   where at least one of said lens elements comprises a tetrachromic contrast enhancer;
   the front and rear lens elements being adhered together with a light-polarizer disposed between the front and rear lens elements, a front exterior surface of the lens being defined by the convex surface of said front lens element, and a rear exterior surface of the lens being defined by the concave surface of rear lens element; and wherein the tetrachromic contrast enhancer:
provides a maximum light transmittance with respect to CIE illuminant D65 for at least one wavelength within each of four wavelength ranges (local maxima), and a minimum light transmittance within each of three intervening wavelength ranges (local minima) between the local maxima;
includes a first local maxima of greater than 75% and less than 85% transmittance in the wavelength range of 415 nm to 430 nm, a second local maxima of greater than 70% and less than 80% transmittance in the wavelength range of 495 nm to 505 nm, a third local maxima of greater than 75% and less than 83% transmittance in the wavelength range of 550 nm to 565 nm, and a fourth local maxima of greater than 75% and less than 84% transmittance in the wavelength range of 615 nm to 645 nm; and
includes a first local minima of less than 50% transmittance, a second local minima of less than 35% transmittance, and a third local minima of less than 20%.

17. The lens of claim 14, where the first local minima is in the wavelength range of 440 nm to 445 nm, the second local minima is in the wavelength range of 518 nm to 525 nm, and the third local minima is in the wavelength range of 582 nm to 587 nm.

18. The lens of claim 16, further comprising an anti-reflective coating.

19. The lens of 16, wherein at least one lens element comprises a rare earth metal oxide that includes one or more of cerium, dysprosium, lanthanum, neodymium erbium, yttrium, ytterbium, and praseodymium.

20. The lens of claim 16, where the lens comprises a borosilicate glass and further comprising frames with the lens being mounted into the frames.

* * * * *